United States Patent
Xiao et al.

(10) Patent No.: US 12,414,540 B2
(45) Date of Patent: Sep. 16, 2025

(54) FEEDER

(71) Applicant: Shenzhen Libro Technology Co., Ltd., Shenzhen (CN)

(72) Inventors: Zhihai Xiao, Shenzhen (CN); Chao Yan, Shenzhen (CN)

(73) Assignee: SHENZHEN LIBRO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/386,997

(22) Filed: Nov. 3, 2023

(65) Prior Publication Data

US 2024/0407330 A1      Dec. 12, 2024

(30) Foreign Application Priority Data

Jun. 9, 2023   (CN) .......................... 202310688947.5
Jun. 9, 2023   (CN) .......................... 202321477213.4

(51) Int. Cl.
    *A01K 5/02*        (2006.01)
(52) U.S. Cl.
    CPC ................................. *A01K 5/0225* (2013.01)
(58) Field of Classification Search
    CPC ........................... A01K 5/0225; A01K 5/0275
    USPC ........................................................ 222/548
    See application file for complete search history.

(56) References Cited

U.S. PATENT DOCUMENTS

| | | | | |
|---|---|---|---|---|
| 533,197 | A * | 1/1895 | Jaeger ................... | G07F 17/166 222/335 |
| 1,301,051 | A * | 4/1919 | Hart ..................... | A01K 5/0114 119/51.01 |
| 1,733,905 | A * | 10/1929 | Randolph ............... | B61D 7/26 294/68.24 |
| 3,727,584 | A * | 4/1973 | Permann ............... | A01K 5/0225 119/56.1 |
| 4,044,722 | A * | 8/1977 | Bradshaw ............ | A01K 5/0291 119/51.13 |
| 5,109,799 | A * | 5/1992 | Lader ................... | A01K 5/0291 119/51.13 |
| 5,372,093 | A * | 12/1994 | Pooshs ................. | A01K 5/0291 119/51.11 |
| 5,709,166 | A * | 1/1998 | Evans ..................... | A01K 5/02 119/51.11 |
| 6,009,835 | A * | 1/2000 | Boschert ................ | A01K 61/85 222/650 |
| 11,895,990 | B1 * | 2/2024 | Johnson ................. | A01K 61/85 |

(Continued)

OTHER PUBLICATIONS

Translation of KR 20220111979 A (Year: 2022).*

*Primary Examiner* — Monica L Perry
*Assistant Examiner* — Brittany A Lowery

(57) ABSTRACT

A feeder for food storage which includes a mount provided with a food outlet hole and a door assembly. The door assembly includes a door panel with a movable side and a fixed side which is configured to close or open the food outlet hole; a rotating shaft; and a pressing member. The fixed side of the door panel is fixedly connected to the rotating shaft, the rotating shaft is rotatably connected to the mount, and the movable side of the door panel is rotatable with respect to the mount via the rotating shaft. The pressing member rotatably mounted to the mount, the pressing member including a first pressing portion configured to exert a pressure to the door panel to reduce a gap between the door panel and the food outlet hole.

11 Claims, 7 Drawing Sheets

(56) References Cited

U.S. PATENT DOCUMENTS

| | | | |
|---|---|---|---|
| 2022/0132799 A1* | 5/2022 | Wang | A01K 5/0291 119/57.91 |
| 2023/0180714 A1* | 6/2023 | Wu | A01K 5/0142 119/57 |

* cited by examiner

FEEDER

CROSS-REFERENCE TO RELATED APPLICATIONS

The present application claims priority to Chinese patent Application No. 2023106889475, filed on Jun. 9, 2023, and claims priority to Chinese patent Application No. 2023214772134, filed on Jun. 9, 2023, the contents of which are incorporated herein by reference in its entireties.

TECHNICAL FIELD

The present disclosure relates to the technical field of food storage, in particular to a feeder.

BACKGROUND

At present, poultry, pets and some other animals can be fed through feeders. The feeder usually includes an accommodating chamber for storing food such as feed and grains. The accommodating chamber outputs the food through structures such as food outlet holes and food outlet channels. In order to prevent food from going bad due to damp and other reasons, it is usually necessary to form a negative pressure in the accommodating chamber. In this case, it is necessary to use a door assembly to cover the corresponding food outlet channel or food outlet hole to ensure the negative pressure in the accommodating chamber.

In the related technology, a linkage mechanism is used to open or close the door assembly, and the door assembly is fixed by means of a dead point position of the linkage mechanism. However, the dead point position of the linkage mechanism is easy to be released, for example, it can be released by applying a slight lateral force. In addition, a seal formed by the door assembly is easy to be damaged, and the seal of the door assembly needs to be improved.

SUMMARY

The main object of the present disclosure is to overcome the defects of the related technology by providing a feeder with good sealing performance.

To achieve the above object, the present disclosure provides a feeder, including: a mount provided with a food outlet hole and a door assembly. A plane perpendicular to an axis of the food outlet hole is inclined with respect to a horizontal plane or parallel to the horizontal plane. The door assembly includes: a door panel configured to close or open the food outlet hole, a second rotating shaft and a pressing member. The door panel includes a movable side and a fixed side. In a position in which the door panel closes the food outlet hole, the movable side of the door panel is higher in a longitudinal direction than the fixed side, or the movable side of the door panel is flush with the fixed side in the longitudinal direction. The fixed side of the door panel is fixedly connected to the second rotating shaft, the second rotating shaft is rotatably connected to the mount, and the movable side of the door panel is rotatable with respect to the mount via the second rotating shaft. The pressing member is rotatably mounted to the mount, the pressing member includes a first pressing portion, and the first pressing portion is configured to exert a pressure onto the door panel to reduce a gap between the door panel and the food outlet hole.

In the feeder of the present disclosure, the door assembly includes the door panel and the pressing member. During the closing of the door panel, when the door panel rotates to a position near the food outlet hole, the first pressing portion exerts a pressure onto the door panel. In this way, it is beneficial for the door panel to reach a preset cooperating position with the food outlet hole, beneficial to improve the abutment tightness between the door panel and the food outlet hole, and beneficial to improve the sealing performance of the feeder.

In the feeder of the present disclosure, when the angle between the door panel and the plane perpendicular to the axis of the food outlet hole 2021 is less than or equal to the first preset angle, the first pressing portion is activated to exert the pressure onto the door panel, so as to reduce the gap between the door panel and the food outlet hole and improve the sealing performance of the feeder.

BRIEF DESCRIPTION OF THE DRAWINGS

In order to explain more clearly technical solutions of the embodiments of the disclosure or the related technology, the drawings for the description of the embodiments and the related technology will be introduced below. Apparently, the drawings in the below description are only used for some embodiments of the disclosure, and other drawings may be acquired based on the structure shown in these drawings by those skilled in the art without creative efforts.

Figure 1:
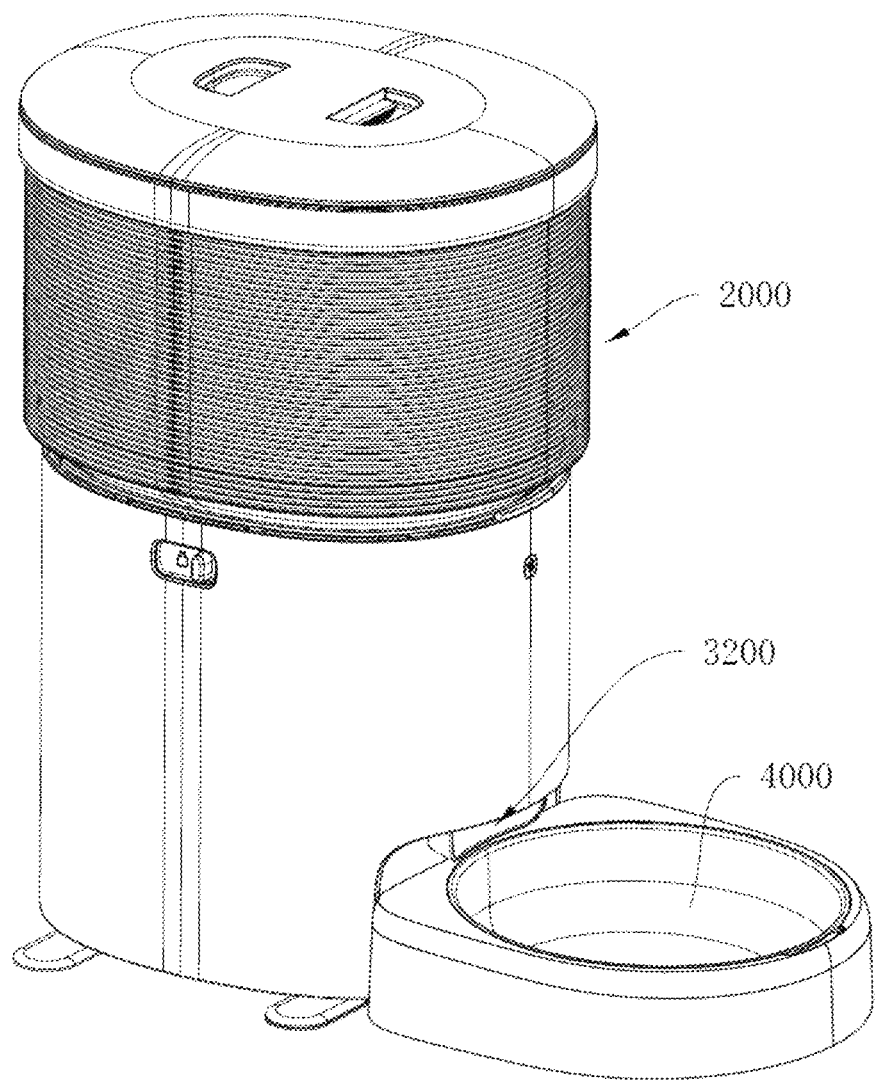
FIG. 1 is a perspective view of an embodiment of a feeder of the present disclosure.

| Reference Symbol | Element | Reference Symbol | Element |
|---|---|---|---|
| 2000 | barrel | 2001 | accommodating chamber |
| 2021 | food outlet hole | 3200 | food outlet channel |
| 3300 | door assembly | 3310 | door panel |
| 3311 | connecting through hole | 3312 | second rotating shaft |
| 3313 | first bump | 3320 | boss |
| 3321 | body | 3322 | elastic cap |
| 3323 | elastic annular plate | 3324 | connecting post |
| 3325 | abutment block | 3331 | first pressing portion |
| 3332 | second batten | 3333 | third batten |
| 3334 | first rotating shaft | 3335 | second bump |
| 3341 | pressure driving device | 3342 | door driving device |
| 3351 | first position switch | 3352 | third position switch |
| 3353 | second position switch | 3361 | vacuum pump |
| 3362 | solenoid valve | 3363 | negative pressure switch |
| 3371 | first through hole | 3372 | second through hole |
| 3373 | third through hole | 3381 | exhaust pipe |
| 3382 | intake pipe | 3383 | negative pressure tube |
| 3510 | mount | 4000 | food bowl |

The implementation of objectives, functional characteristics and advantages of the disclosure will be further described with reference to accompanying drawings in combination with embodiments.

DETAILED DESCRIPTION

Hereinafter a clear and complete description will be given for explaining the technical solution in the embodiments of the present disclosure with reference to the drawings of the embodiments of the present disclosure. It should be noted that the described embodiments are only part of and not all of the embodiments of the present disclosure. All other embodiments obtained by those of ordinary skill in the art based on the embodiments in the present disclosure without creative efforts fall within the scope of protection of the present disclosure.

It should be noted that directional and positional terms in the embodiments of the present disclosure, such as "upper", "lower", "left", "right", "front" and "rear" are used to explain the relative position relationship and movement of the elements in a specific attitude. It should be understood that these directional terms may correspondingly change when the specific attitude is changed.

In the embodiments of the present disclosure, the terms "first" and "second" are used merely for descriptive purposes, and are not to be construed as indicating or implying relative importance or implicitly specifying the quantity of indicated technical features. Thus, the features defined as "first", "second" may explicitly or implicitly mean that there is at least one said features. In addition, the meaning of the term "and/or" or "and/or" includes any and all combinations of one or more of the associated listed items. For example, "A and/or B" includes scheme A, scheme B, or a scheme including both A and B. In addition, the technical solutions of the various embodiments may be combined with each other as long as the person of ordinary skill in the art can realize it. If the combination of the technical solutions results in a contradictory or the combination of the technical solutions is impossible to realize, it should be considered that the combination of the technical solutions does not exist and is not within the scope of protection of the present disclosure.

In the related technology, a linkage mechanism is used to open or close a door assembly, and the door assembly is fixed by means of a dead point position of the linkage mechanism. However, the dead point position of the linkage mechanism is easy to be released, for example, it can be released by applying a slight lateral force. In addition, a seal formed by the door assembly is easy to be damaged, and the seal stability of the door assembly needs to be improved.

Therefore, the present disclosure provides a feeder to improve the sealing stability of a door assembly.

Figure 2:
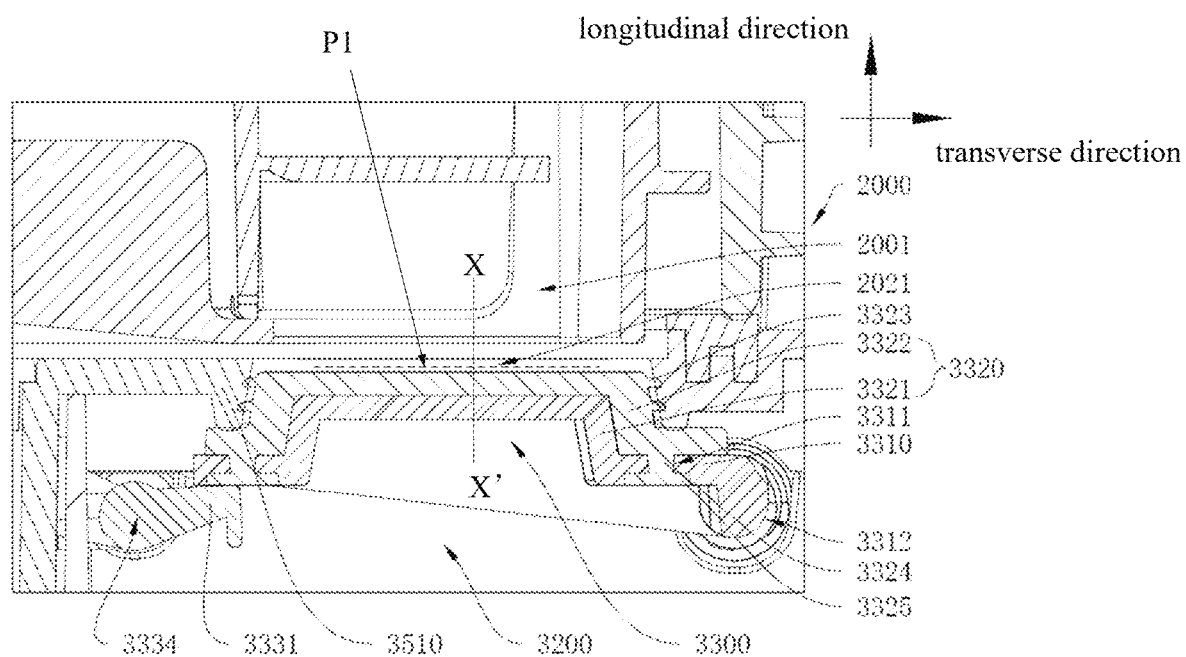
FIG. 2 is a schematic view showing a cooperation between a door assembly and a food outlet hole in an embodiment of a feeder of the present disclosure.

Referring to FIGS. 1 and 2, in an embodiment of the present disclosure, the feeder includes a mount 3510 and a door assembly 3300. In the mount 3510, a food outlet hole 2021 is provided, and a plane P1 perpendicular to an axis X-X' of the food outlet hole 2021 is inclined with respect to a horizontal plane or parallel to the horizontal plane. The horizontal plane refers to a plane on which the feeder is placed normally, such as the ground, table top or countertop. Referring to FIG. 2, the door assembly 3300 includes a door panel 3310 and a pressing member. The door panel 3310 is configured to close or open the food outlet hole 2021. The door panel 3310 includes a movable side and a fixed side. When the door panel 3310 is located at a position in which the door panel 3310 closes the food outlet hole 2021, the movable side of the door panel 3310 is higher in a longitudinal direction than the fixed side, or the movable side of the door panel 3310 is flush with the fixed side in the longitudinal direction. The fixed side of the door panel 3310 is fixedly connected to a second rotating shaft 3312. The second rotating shaft 3312 is rotatably connected to the mount 3510. The movable side of the door panel 3310 can rotate relative to the mount 3510 through the second rotating shaft 3312.

The pressing member is rotatably mounted to the mount 3510, and includes a first pressing portion 3331. The first pressing portion 3331 may exert a pressure onto the door panel 3310 to reduce a gap between the door panel 3310 and the food outlet hole 2021, thereby improving the abutment tightness between an outer peripheral wall of a boss 3320 and an inner peripheral wall of the food outlet hole 2021. The feeder may also include a barrel 2000. The barrel 2000 defines an accommodating chamber 2001, so that food can be accommodated by the accommodating chamber, and can be outputted by communicating the accommodating chamber 2001 with the food outlet hole 2021. In addition, the feeder may also be provided with a food outlet channel 3200 and a food bowl 4000. The food outlet channel 3200 is in communication with the food outlet hole 2021, and an outlet of the food outlet channel 3200 is arranged to be opposite to the food bowl 4000, so that the food may pass through the food outlet hole 2021 and the food outlet channel 3200 in turn and then reach the food bowl 4000. In the feeder, the flow of food is guided by the food outlet channel 3200, which can reduce the dispersion of food after being outputted. Of course, the feeder can directly output food to the food bowl 4000 through the food outlet hole 2021 instead of providing the food outlet channel 3200. The door panel 3310 may be arranged in the food outlet channel 3200, to enhance the structural compactness of the whole feeder. It should be noted that the door panel 3310 may also be arranged at the outlet of the food outlet channel 3200, but the embodiment of the present disclosure is not limited thereto.

Referring to FIG. 2, one side of the door panel 3310 is rotatably mounted to the mount 3510, and the door panel 3310 is provided with the boss 3320. The outer peripheral wall of the boss 3320 is adapted to abut against the inner peripheral wall of the food outlet hole 2021, thereby allowing a tight fit such as an interference fit by the abutment.

In this embodiment, the door assembly 3300 includes the door panel 3310 and the pressing member. As such, in the closing process of the door panel 3310, after the door panel 3310 pivots to cause the outer peripheral wall of the boss 3320 to approach or abut against the inner peripheral wall of the food outlet hole 2021, the first pressing portion 3331 applies a pressure to the door panel 3310. This is beneficial to bring the door panel 3310 and the boss 3320 to a preset cooperating position with the food outlet hole 2021, beneficial to improve the abutment tightness between the door panel 3310 and the food outlet hole 2021, and beneficial to improve the sealing stability of the door assembly 3300.

In some embodiments, the first pressing portion 3331 may be configured to abut against the other side of the door panel 3310 opposite to a rotational connection side to move the door panel 3310 toward the food outlet hole 2021. For example, in FIG. 2, the right side of the door panel 3310 is the rotational connection side with the mount 3510, and the left side of the door panel 3310 is abutted by the first pressing portion 3331. Since one side of the door panel 3310 is rotatably connected to the mount 3510, for example, in a pivotal manner, the restriction on the pivot of the first pressing portion 3310 can be released when the door panel 3331 is able to move to the outside the pivot envelope circle of the door panel 3310. Alternatively, the first pressing portion 3331 is set to have a large movement range, so as to avoid the first pressing portion 3331 excessively limiting an opening degree of the door panel 3310, so that the door panel 3310 can reach a preset opening degree.

In this embodiment, since the first pressing portion 3331 abuts against the other side of the door panel 3310 opposite to the rotational connection side, the acting moment is larger. For the same acting force, the embodiment of the present disclosure is more beneficial to improve the abutment tightness between the boss 3320 and the food outlet hole 2021, and to improve the sealing stability of the door assembly 3300.

Specifically, the door assembly 3300 may include a second rotating shaft 3312 rotatably connected to the mount 3510. A first rotating shaft 3334 and the second rotating shaft 3312 are disposed on opposite sides of the food outlet hole 2021. The first rotating shaft 3334 corresponds to the rotational connection side of the door panel 3310 and the mount 3510.

In some embodiments, the pressing member also includes a second pressing portion that may exert a pressure onto the door panel 3310 to increase the gap between the door panel 3310 and the food outlet hole 2021. For example, the second pressing portion is configured for abutting against a surface of the door panel 3310 facing the boss 3320, to move the door panel 3310 in a direction away from the food outlet hole 2021, thereby reducing the abutment tightness between the boss 3320 and the food outlet hole 2021 and enlarging the gap between the door panel 3310 and the food outlet hole 2021. In this way, door panel 3310 is tilted, which makes it easier for the door panel 3310 to turn to the open state. Correspondingly, the first pressing portion 3331 is configured to abut against a surface of door panel 3310 away from the boss 3320, so as to move door panel 3310 towards the food outlet hole 2021, thereby reducing the gap between the door panel 3310 and the food outlet hole 2021.

Figure 3:
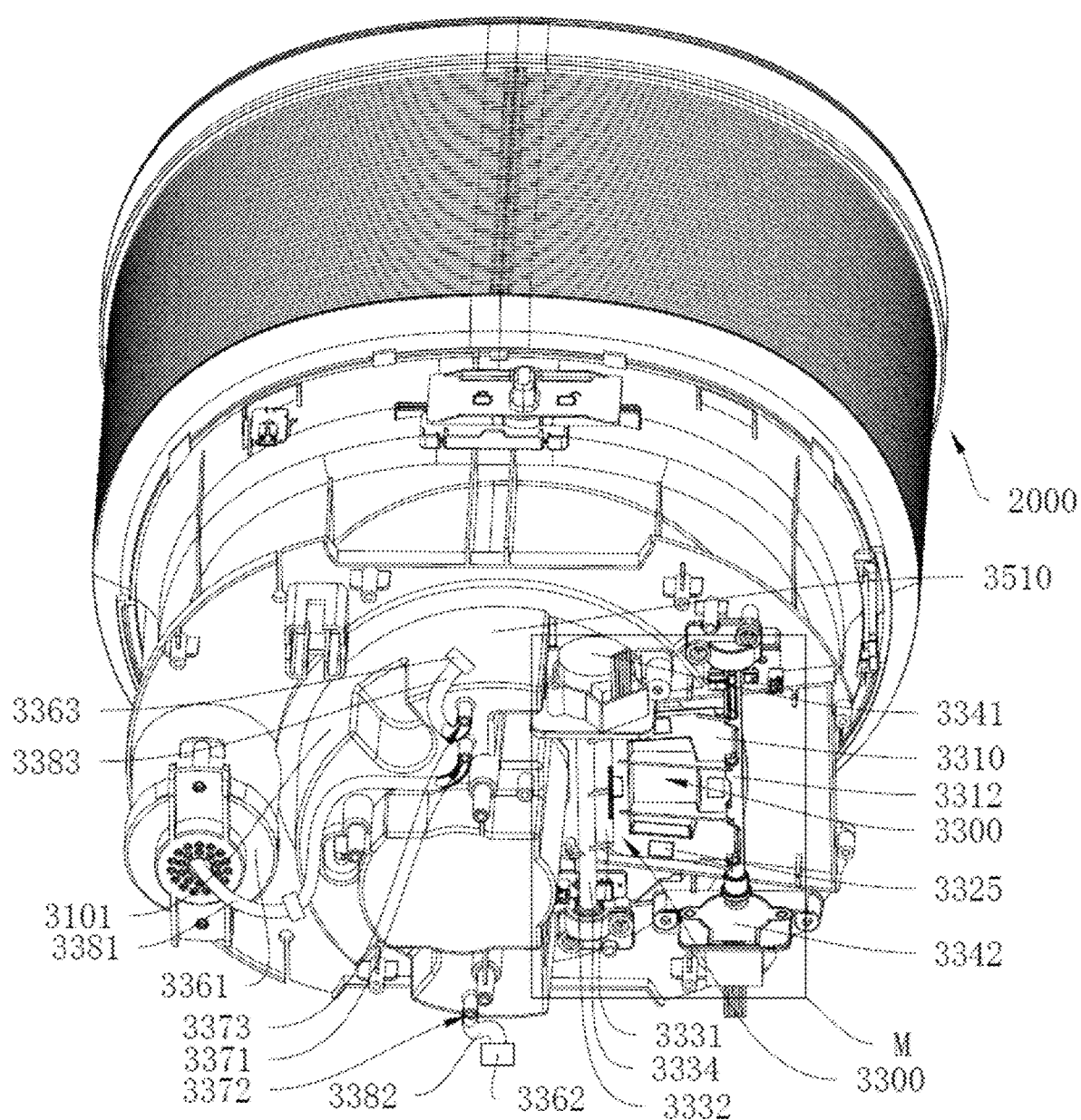
FIG. 3 is a perspective view in an upward visual angle of an embodiment of a feeder of the present disclosure (a part of the structure is hidden).
Figure 4:
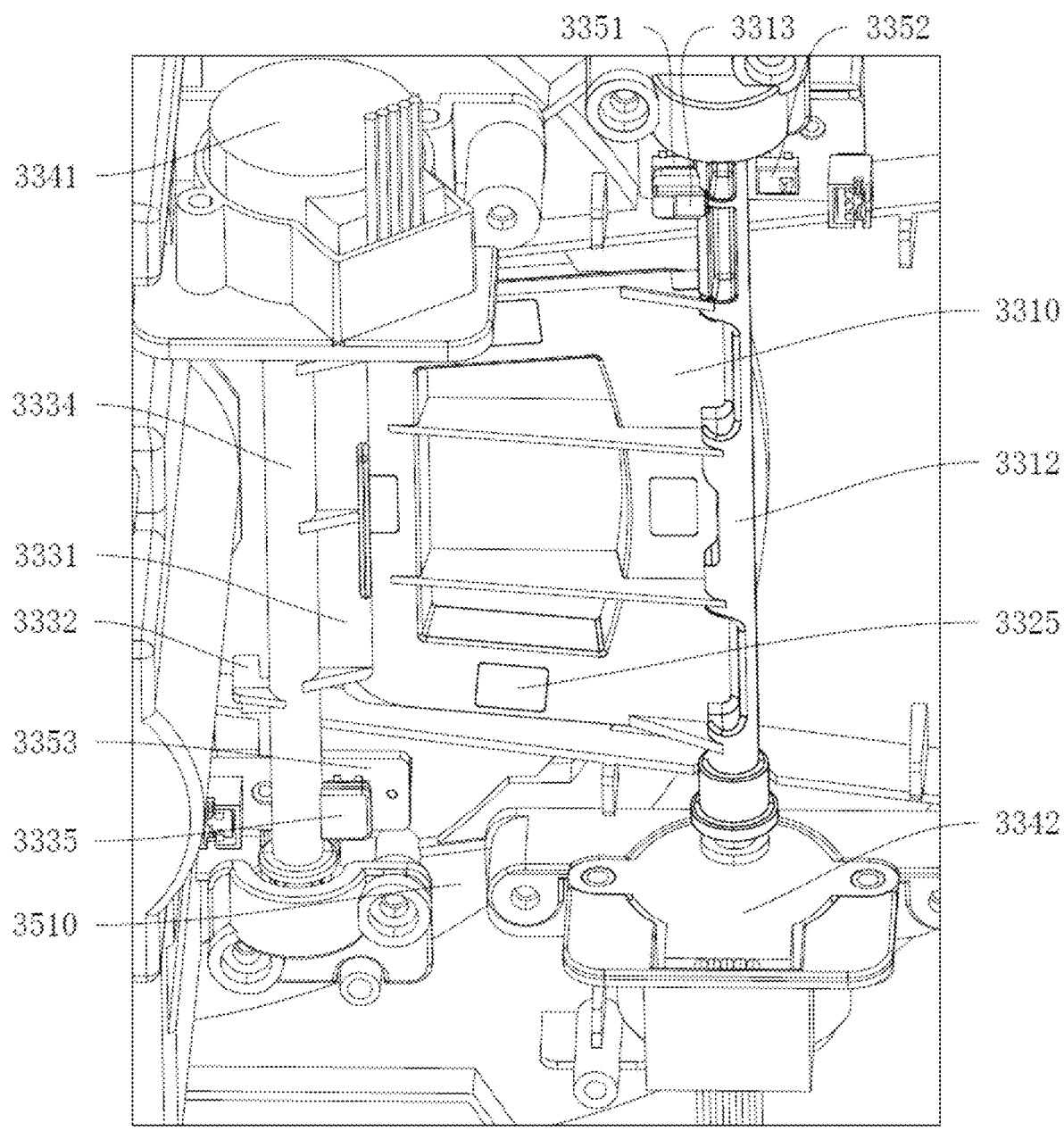
FIG. 4 is an enlarged partial view showing area M of FIG. 3.
Figure 5:
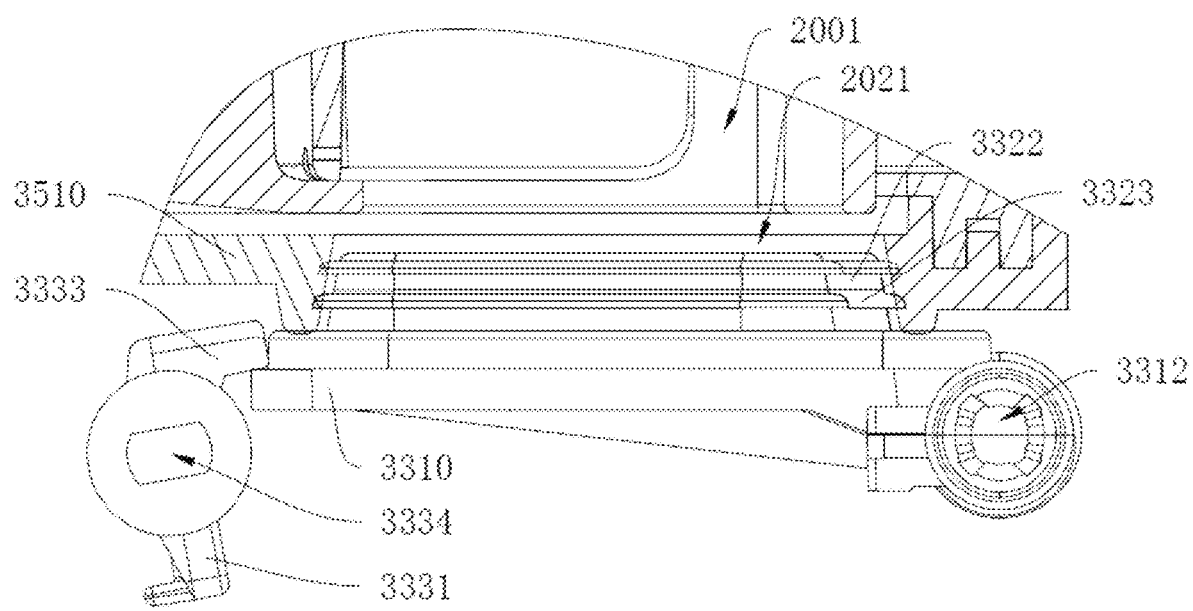
FIG. 5 is a schematic view showing a cooperation between a door assembly and a food outlet hole under another status in an embodiment of a feeder of the present disclosure.
Figure 6:
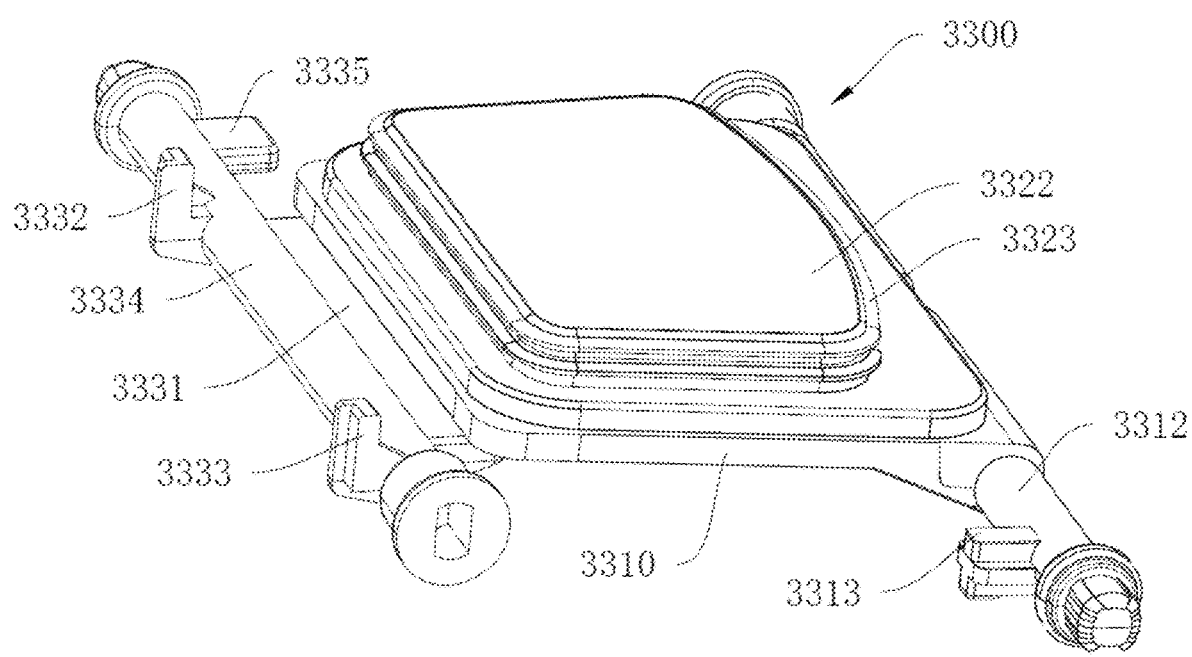
FIG. 6 is a perspective view of a door assembly in an embodiment of the present disclosure (a part of the structure is hidden).

Referring to FIGS. 3 and 4, the pressing member may also include a first rotating shaft 3334, the first rotating shaft 3334 is rotatably to the mount 3510. The first pressing portion 3331 and the second pressing portion may be provided on an outer peripheral wall of the first rotating shaft 3334. Referring to FIGS. 5 and 6, the second pressing portion may include a second batten 3332 and a third batten 3333. The second batten 3332 and the third batten 3333 are spaced apart from each other in an axial direction of the first rotating shaft 3334. The second batten 3332 and the third batten 3333 may be provided on the same generatrix of the outer peripheral wall of the first rotating shaft 3334. The second batten 3332 and the third batten 3333 are configured to abut against the door panel 3310 so as to assist in opening the door panel 3310. The second batten 3332 and the third batten 3333 are spaced apart from each other in the axial direction of the first rotating shaft 3334. The second batten 3332 and the third batten 3333 can act on two spaced positions of the door panel 3310, for example, each of the second batten 3332 and the third batten 3333 abuts against a respective one of two corners of the door panel 3310. After the two spaced positions of the door panel 3310 are abutted by the battens, the plate plane of the door panel 3310 will warp slightly, which will force the outer peripheral wall of the boss 3320 to warp correspondingly. The abutment tightness degree at the abutment position of the outer peripheral wall of the boss 3320 and the inner peripheral wall of the food outlet hole 2021 can be reduced locally at first, and then the abutment tightness degree at other positions are reduced, which is beneficial to reduce the force for opening the door panel 3310, and beneficial to open the door assembly 3300. When there is a residual negative pressure in the accommodating chamber 2001, the corresponding warp of the outer peripheral wall of the boss 3320 is beneficial to relieve the negative pressure more quickly, which facilitates the opening of the door assembly 3300.

In some embodiments, referring to FIGS. 5 and 6, the second batten 3332 is L-shaped, one end of the L-shape is connected to the first rotating shaft 3334, and the other end of the L-shape extends in a direction away from the first rotating shaft 3334. The second batten 3332 is configured to abut against the surface of the door panel 3310 adjacent to the boss 3320, to cause door panel 3310 to sink. The second batten 3332 is L-shaped, which can reduce the risk of interference with the rotation of the door panel 3310 and improve the rotation smoothness of the door panel 3310. The second batten 3332 may include a longitudinal extension portion and a transverse extension portion which are connected to each other to form the L-shape. The longitudinal extension portion may be configured to extend in a radial direction of the first rotating shaft 3334 and be connected to the first rotating shaft 3334, and the transverse extension portion is connected to an end of the longitudinal extension portion away from the first rotating shaft 3334. The transverse extension portion is intended to move into the gap between the food outlet hole 2021 and the surface of the door panel 3310 adjacent to the boss 3320, so as to increase the gap between the door panel 3310 and the food outlet hole 2021 and reduce the interference with the rotation of the door panel 3310, by abutting the transverse extension portion against the surface of door panel 3310 adjacent to the boss 3320.

In addition, the first pressing portion 3331 may be configured to be fixedly connected to the second pressing portion. For example, the first pressing portion 3331 is fixedly connected to the second pressing portion directly, or the first pressing portion 3331 is fixedly connected to the second pressing portion through an intermediate connection structure such as the first rotating shaft 3334. The first pressing portion 3331 and the second pressing portion may be fixedly connected to the outer peripheral wall of the first rotating shaft 3334, for example, the first pressing portion 3331, the second pressing portion and the first rotating shaft 3334 may be formed in one piece, or the first pressing portion 3331 and the second pressing portion may be fixedly connected to the first rotating shaft 3334 by means of bolt connection, slot connection, snap connection, etc. This embodiment is not limited thereto. The first pressing portion 3331 and the second pressing portion may be disposed at intervals in the circumferential direction of the first rotating shaft 3334 so as to form a circumferential angle. In this case, when the first rotating shaft 3334 is in a position in which the first pressing portion 3331 abuts against the door panel 3310, the second pressing portion acts on the door panel 3310 only after the first rotating shaft 3334 continues to rotate by a certain angle, which reduces the risk that the first pressing portion 3331 and the second pressing portion act on the door panel 3310 at the same time, and reduces the risk that the door assembly 3300 is accidentally opened when it needs to be closed or the door assembly 3300 is blocked when it needs to be opened.

Referring to FIGS. 5 and 6, the first pressing portion 3331 includes a first batten. The first batten extends in the axial direction of the first rotating shaft 3334 such that the first batten is in the shape of a rectangle extending in the axial direction of the first rotating shaft 3334. The first batten is configured to abut against the surface of the door panel 3310 away from the boss 3320 to lift the door panel 3310 upward. In this embodiment, the first batten is configured to abut against the surface of the door panel 3310 away from the boss 3320 to move the door panel 3310 toward the food outlet hole 2021, i.e., to assist in closing the door panel 3310. Before closing the door panel 3310, the food outlet hole 2021 is in an open state, and the accommodation chamber 2001 is in a normal pressure state or a slight negative pressure state due to the early opening of a pump such as a vacuum pump, which results in less resistance to closing the door panel 3310. The first batten extends in the axial direction of the first rotating shaft 3334. The first batten is in the shape of a rectangle extending in the axial direction of the first rotating shaft 3334, which can increase the action area with the door panel 3310, make the door assembly 3300 to close the food outlet hole 2021 more smoothly, reduce the local action of the door assembly 3300 when cooperating with the food outlet hole 2021, and reduce the risk of damage to the door assembly 3300.

In some embodiments, referring to FIGS. 5 and 6, the boss 3320 includes a body 3321, which may be formed in one piece with the door panel 3310, and an elastic cap 3322, which may be made of a plastic material having elasticity. The elastic cap 3322 is arranged around the boss body 3321. An outer peripheral wall of the elastic cap 3322 is configured to abut against the inner peripheral wall of the food outlet hole 2021. In this embodiment, since the elastic cap 3322 itself has elasticity, the stability of a tight fit between the outer peripheral wall of the elastic cap 3322 and the inner peripheral wall of the food outlet hole 2021 formed after the elastic cap 3322 abuts against the inner peripheral wall of the food outlet hole 2021 can be improved, and thus the stability of the closing of the food outlet hole 2021 by the door assembly 3300 can be further improved.

Figure 7:
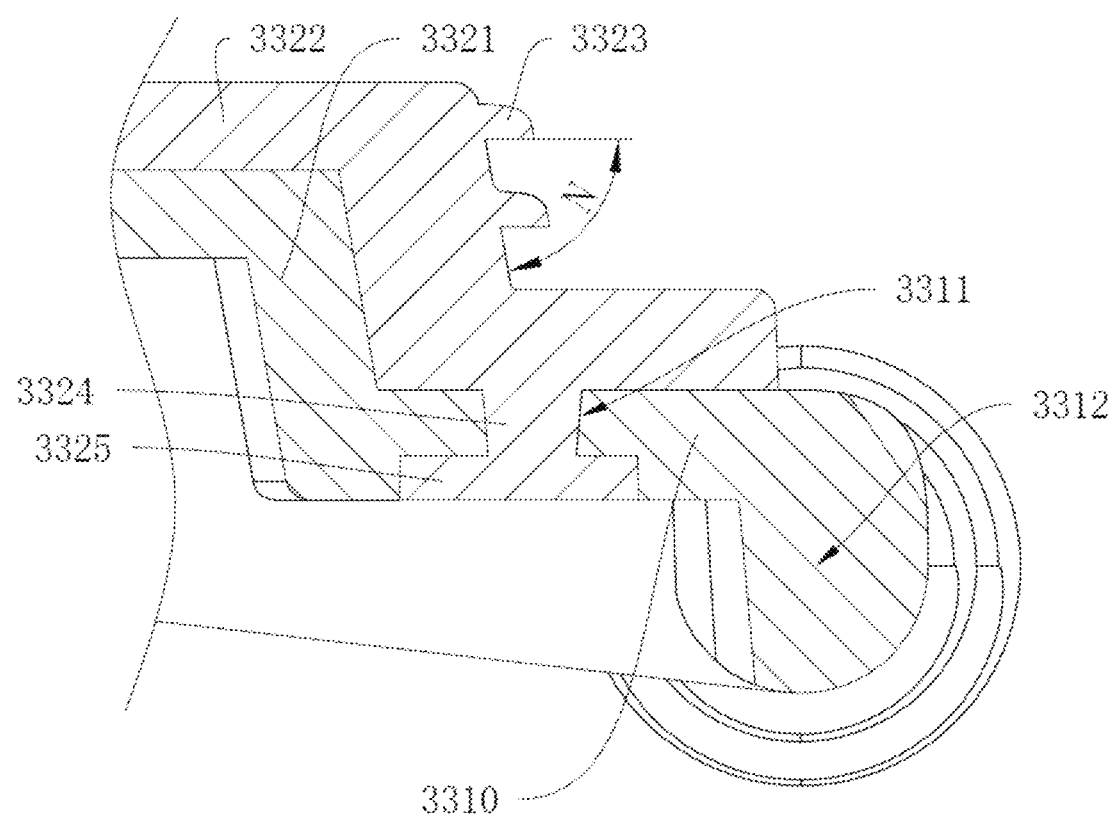
FIG. 7 is a cross-sectional view of a door assembly in an embodiment of the present disclosure.

In some embodiments, referring to FIGS. 6 and 7, the outer peripheral wall of the elastic cap 3322 is provided with an elastic annular plate 3323. The elastic annular plate extends in a circumferential direction of the elastic cap 3322. In the process of closing the door assembly 3300, the elastic annular plate 3323 can be folded when it is abutted. Due to the elastic force generated after the folding, the stability of tight fit with the inner peripheral wall of the food outlet hole 2021 is further improved, and the stability of the closing of the food outlet hole 2021 by the door assembly 3300 can be further improved.

In some embodiments, referring to FIG. 5, the outer peripheral wall of the elastic cap 3322 is inclined, and the cross-sectional area of a top of the elastic cap 3322 is less than the cross-sectional area of a bottom of the elastic cap 3322 to facilitate access of the boss 3320 into the food outlet hole 2021. Correspondingly, the inner peripheral wall of the food outlet hole 2021 may also be inclined, and the diameter of the food outlet hole 2021 increases in a direction away from the accommodating chamber 2001. An angle between a surface of the elastic annular plate 3323 and the outer peripheral wall at the bottom of the elastic cap 3322 is less than 90 degrees (see an angle N in FIG. 7). In this embodiment, when closing the door assembly 3300, the elastic annular plate 3323 is liable to inclined backward, so that the elastic annular plate 3323 is barb-shaped after the door assembly is closed. In this way, the resistance to the opening of the door assembly 3300 is enhanced, and the stability of the closing of the food outlet hole 2021 by the door assembly 3300 is further improved. The outer peripheral wall of the elastic cap 3322 may be provided with at least two elastic annular plates 3323. The elastic annular plates 3323 are arranged at intervals in a height direction of the elastic cap 3322, to further enhance the resistance to the opening of the door assembly 3300 and further improve the stability of the closing of the food outlet hole 2021 by the door assembly 3300.

Referring to FIG. 7, in order to improve the stability of the elastic cap 3322 arranged around the body 3321, the door panel 3310 may be provided with a connecting through hole 3311, and the bottom of the elastic cap 3322 may be provided with a connecting post 3324 and an abutment block 3325 which is provided on a side of the door panel 3310 away from the elastic cap 3322. The connecting post 3324 passes through the connecting through hole 3311 and is connected to the abutment block 3325. The abutment block 3325 abuts against the door panel 3310, thereby better preventing the elastic cap 3322 from falling off by the abutment block 3325. The elastic cap 3322, the elastic annular plate 3323, the connecting post 3324, and the abutment block 3325 may be made in one piece on the door panel 3310 by, for example, an encapsulation process. Of course, the elastic cap 3322, the elastic annular plate 3323, the connecting post 3324 and the abutment block 3325 may be made in one piece at first, and then the abutment block 3325 may be squeezed through the connecting through hole 3311 by means of the elasticity of the abutment block 3325. This embodiment is not limited thereto.

In some embodiments, the door assembly 3300 further includes a pressure driving device 3341 that drives the pressing member into rotation through the first shaft 3334. The door assembly 3300 also includes a door driving device 3342 that drives the door panel 3310 into rotation through the second rotating shaft 3312. The pressure driving device 3341 may be connected to the first pressing portion 3331. The pressure driving device 3341 may be directly connected to the first pressing portion 3331, or the pressure driving device 3341 may also be connected to the first pressing portion 3331 through an intermediate connection structure of the first rotating shaft 3334 described above. Because the first pressing portion 3331 is fixedly connected to the second pressing portion, the pressure driving device 3341 can drive the first pressing portion 3331 or the second pressing portion to abut against the door panel 3310. The door driving device 3342 may be connected to the door panel 3310, for example, the door driving device 3342 may be connected to the door panel 3310 through the above-mentioned second rotating shaft 3312, so as to drive the door panel 3310 to pivot. Each of the pressure driving device 3341 and the door driving device 3342 may be a drive motor, a drive cylinder, a drive hydraulic cylinder, etc. This embodiment is not limited thereto. If necessary, a transmission mechanism and an intermediate connection structure can be provided between the pressure driving device 3341 and the first pressing portion 3331 or the second pressing portion, or between the door driving device 3342 and the door panel 3310. In this embodiment, the pressure driving device 3341 and the door driving device 3342 can be independently driven. For example, the pressure driving device 3341 can be supplied with a driving current, a driving air pressure or a driving hydraulic pressure greater than that for the door driving device 3342, because the pressure driving device 3341 needs to hold the door assembly 3300 tightly. Therefore, each of the pressure driving device 3341 and the door driving device 3342 can be selected from models having a narrow power range and a narrow application range, which is conducive to reducing the cost of the pressure driving device 3341 and the door driving device 3342. In addition, since the pressure driving device 3341 and the door driving device 3342 can be driven independently, the intermediate transmission structure can be eliminated, which is beneficial to the miniaturization of the feeder.

In some embodiments, the door assembly 3300 may include a first position switch 3351 for detecting a pivot angle of the door panel 3310. The first position switch 3351 may be electrically connected to the pressure driving device 3341. The first position switch 3351 may be in the form of a limit switch, a travel switch, a photoelectric sensor, or a laser rangefinder, an encoder corresponding to a driving motor, but the embodiment is not limited thereto. When an angle between the surface of the door panel 3310 facing the boss 3320 and the plane P1 perpendicular to the axis X-X' of the food outlet hole 2021 is less than or equal to a first preset angle, the first position switch 3351 generates a first position information, and in response to the first position information, the pressure driving device 3341 drives the first pressing portion 3331 to exert a pressure onto the door panel 3310. In this embodiment, when the door assembly 3300 pivots to a position close to the food outlet hole 2021 or to a position in which the door assembly 3300 abuts against the food outlet hole 2021, the first position information is used to cause the abutment action of the first pressing portion 3331 to the door panel 3310. In this way, the waiting time of the first pressing portion 3331 in the process of closing the door assembly 3300 can be reduced and the closing efficiency of the door assembly 3300 can be improved.

In some embodiments, the door assembly 3300 may also include a second position switch 3353 for detecting the position of one of the first pressing portion 3331 and the second pressing portion. Since the first pressing portion 3331 and the second pressing portion are fixedly connected to each other, the position of the other of the first pressing portion 3331 and the second pressing portion can be deduced. The second position switch 3353 may be in the form of a limit switch, a travel switch, a photoelectric sensor, or a laser rangefinder, an encoder corresponding to a driving motor, but the embodiment is not limited thereto. The second position switch 3353 may be electrically connected to the pressure driving device 3341. When the first pressing portion 3331 abuts against the door panel 3310 and moves to a preset position (that is, after the outer peripheral wall of the boss 3320 abuts against the inner peripheral wall of the food outlet hole 2021 to a certain extent), the second position switch 3353 generates a second position information, and the pressure driving device 3341 stops the movement and stops the power output according to the second position information. In this embodiment, after the outer peripheral wall of the boss 3320 and the inner peripheral wall of the food outlet hole 2021 reach the desired cooperation position, the pressure driving device 3341 can stop the movement and stop the power output according to the second position information, thereby reducing the power consumption of the pressure driving device 3341.

In addition, the first position switch 3351 may be electrically connected to the door driving device 3342. When the angle between the surface of the door panel 3310 facing the boss 3320 and the plane P1 perpendicular to the axis X-X' of the food outlet hole 2021 is greater than the first preset angle, the first position switch 3351 generates a fourth position information, and the door driving device 3342 drives the door panel 3310 to move away from the food outlet hole 2021 according to the fourth position information. In this embodiment, when the door assembly 3300 is opened to a preset degree at the position in which the door assembly is tightly engaged with the food outlet hole 2021, an interaction force between the door assembly 3300 and the food outlet hole 2021 is small. At this time, according to the fourth position information, the door driving device 3342 is switched to be available to drive the door panel 3310 to move away from the food outlet hole 2021, which can save the power output of the pressure driving device 3341 which has higher power. In this embodiment, the waiting time for the switching between the pressure driving device 3341 and the door driving device 3342 is shorter in two different stages (i.e., a stage of releasing the tight cooperation of the door assembly 3300 and a stage of continuing the opening of the door assembly), which is beneficial to improving the opening efficiency of the door assembly 3300.

In some embodiments, the door assembly 3300 may also include a third position switch 3352. The third position switch 3352 generates a third position information when the angle between the surface of the door panel 3310 facing the boss 3320 and the plane P1 perpendicular to the axis X-X' of the food outlet hole 2021 is greater than or equal to a second preset angle which is greater than the first preset angle. The third position switch 3352 may be electrically connected to the door driving device 3342. When the angle between the surface of the door panel 3310 facing the boss 3320 and the plane P1 perpendicular to the axis X-X' of the food outlet hole 2021 is greater than or equal to the second preset angle, the door driving device 3342 stops power output according to the third door position information. In this embodiment, the door driving device 3342 can stop the power output after the door panel 3310 is opened to a required large degree, thereby reducing the energy consumption of the door driving device 3342.

Referring to FIG. 4, a peripheral wall of the second rotating shaft 3312 may be provided with a first bump 3313 configured to trigger the first position switch 3351 and the third position switch 3352. The door panel 3310, the first bump 3313, and the second rotating shaft 3312 may be formed in one piece by a process such as injection molding or metal casting. When the angle between the surface of the door panel 3310 facing the boss 3320 and the plane P1 perpendicular to the axis X-X' of the food outlet hole 2021 is less than or equal to the first preset angle, the first bump 3313 abuts against the first position switch 3351, which in turn generates the first position information. When the angle between the surface of the door panel 3310 facing the boss 3320 and the plane P1 perpendicular to the axis X-X' of the food outlet hole 2021 is greater than the first preset angle, the first bump 3313 disengages from the first position switch 3351, which in turn generates the fourth position information. Thanks to the first position switch 3351, the occupied installation space can be reduced and the structural compactness of the feeder can be improved. The installation space occupied by the third position switch 3352 is also small, which is also beneficial to reduce the volume of the feeder.

In addition, a second bump 3335 suitable for triggering the second position switch 3353 is provided on a peripheral wall of the first rotating shaft 3334. The first rotating shaft 3334 and the second bump 3335 may be formed in one piece by a process such as injection molding or metal casting. When the first pressing portion 3331 abuts against the door panel 3310 and moves to the preset position, the second bump 3335 abuts against the second position switch 3353, which in turn generates the second position information. Thanks to the second position switch 3353, the occupied installation space can be reduced and the structural compactness of the feeder can be improved.

Referring to FIG. 3, the feeder may also include a vacuum pump 3361. The feeder also includes a first through hole 3371 in communication with the accommodating chamber 2001, and the vacuum pump 3361 is in communication with the first through hole 3371 through an exhaust pipe 3381. The second position switch 3353 is electrically connected to the vacuum pump 3361 which is actuated according to the second position information. In this embodiment, since the second position information is generated when the first pressing portion 3331 abuts against the door panel 3310 and moves to the preset position, the vacuum pump 3361 can be activated and perform the vacuumizing operation after the door assembly 3300 is closed, thereby reducing the waiting time for the vacuumizing operation and improving the vacuumizing efficiency.

The feeder may also include a negative pressure switch 3363 which may be in the form of an electronic pressure switch or the like. The feeder also includes a third through hole 3373 in communication with the accommodating chamber 2001, and the negative pressure switch 3363 is in communication with the third through hole 3373 through a negative pressure pipe 3383. The negative pressure switch 3363 may be electrically connected to the vacuum pump 3361. When a vacuum degree in the accommodating chamber 2001 is greater than or equal to a first preset vacuum degree, the negative pressure switch 3363 outputs a first pressure signal. The vacuum pump 3361 is stopped according to the first pressure signal, thereby reducing the power loss of the vacuum pump 3361.

The feeder may also include a solenoid valve 3362, and the feeder further includes a second through hole 3372 in communication with the accommodating chamber 2001. The solenoid valve 3362 is in communication with the second through hole 3372 through an intake pipe 3382. The solenoid valve 3362 is configured to allow or prevent the communication between the accommodating chamber 2001 and the outside, so that the pressure of the accommodating chamber 2001 under the negative pressure can be relieved or maintained by the solenoid valve 3362. The negative pressure switch 3363 may be electrically connected to the pressure driving device 3341. When the vacuum degree in the accommodating chamber 2001 is less than or equal to a second preset vacuum degree lower than the first preset vacuum degree, the negative pressure switch 3363 outputs a second pressure signal. The pressure driving device 3341 drives the second pressing portion to abut against the door panel 3310 according to a door opening instruction and the second pressure signal, so as to tilt the door panel 3310 and facilitate the subsequent opening of the door panel 3310. Since the pressure driving device 3341 drives the second pressing portion to abut against the door panel 3310 according to the door opening instruction and the second pressure signal, the time of door opening action can be reduced, a unexpected opening can also be avoided by combining the door opening instruction and the second pressure signal (for example, when the accommodating chamber 2001 is damaged and the vacuum degree becomes to be less than or equal to the second preset vacuum degree due to the air leakage, the unexpected opening of the door assembly 3300 in the absence of the door opening instruction can be avoided).

The feeder includes the barrel 2000 and the vacuum pump 3361. The barrel 2000 is mounted at the mount 3510, the barrel 2000 defines the accommodating chamber 2001 for storing food, and the food outlet hole is in communication with the accommodating chamber 2001. The vacuum pump 3361 is in communication with the accommodating chamber 2001.

The feeder may also include an electronic control board. The vacuum pump 3361, the negative pressure switch 3363, the solenoid valve 3362, the first position switch 3351, the second position switch 3353, the third position switch 3352, the pressure driving device 3341 and the door driving device 3342 are respectively electrically connected to the electric control board, thereby reducing the total length of the connecting wires of the feeder by the electric control board and improving the space utilization rate of the feeder.

In addition, the door assembly 3300 includes the first position switch 3351 which generates the first position information when the angle between the door panel 3310 and the plane P1 perpendicular to the axis X-X' of the food outlet hole 2021 is less than or equal to the first preset angle. The feeder can be controlled by the following operations of:

acquiring a door closing instruction and controlling the door panel 3310 to move in the direction towards the food outlet hole 2021 (for example, the door driving device 3342 drives the second rotating shaft 3312 into rotation, thereby moving the door panel 3310 in the direction towards the food outlet hole 2021); and controlling the first pressing portion 3331 to exert a pressure onto the door panel 3310 in response to the first position information (for example, the pressure driving device 3341 drives the first pressing portion 3331 to exert the pressure onto the door panel 3310).

In this embodiment, in the closing process of the door panel 3310, after the door panel 3310 pivots to the position near the food outlet hole 2021 (i.e., when the angle between the door panel 3310 and the plane P1 perpendicular to the axis X-X' of the food outlet hole 2021 is less than or equal to the first preset angle), the first pressing portion 3331 applies a pressure to the door panel 3310. This is beneficial to bring the door panel to the preset cooperating position with the food outlet hole 2021, beneficial to improve the abutment tightness between the door panel 3310 and the food outlet hole 2021, and beneficial to improve the sealing stability of the door assembly 3300.

In this embodiment, the door panel 3310 is provided with the boss 3320, and the outer peripheral wall of the boss 3320 is configured to abut against the inner peripheral wall of the food outlet hole 2021. The angle between the door panel 3310 and the plane P1 perpendicular to the axis X-X' of the food outlet hole 2021 can be an angle between the surface of the door panel 3310 facing the boss 3320 and the plane P1 perpendicular to the axis X-X' of the food outlet hole 2021. The door assembly 3300 also includes the second position switch 3353 which generates the second position information when the first pressing portion 3331 reaches the preset position. The feeder can also be controlled by the following operation of:

after the operation of "controlling the first pressing portion to exert the pressure onto the door panel in response to the first position information", controlling the first pressing portion 3331 to stop moving in response to the second position information (for example, the driving of the first pressing portion 3331 is stopped by stopping the pressure driving device 3341).

In this embodiment, during the closing of the door panel 3310, the movement of the first pressing portion 3331 is stopped after the first pressing portion 3331 exerts the pressure to the door panel 3310 to cause the door panel 3310 to abut against the food outlet hole 2021, which can reduce the loss and interference of the elements and enhance the stability of the device.

In some embodiments, the pressing member also includes the second pressing portion which may exert the pressure onto the door panel 3310 to increase the gap between the door panel 3310 and the food outlet hole 2021. The door assembly 3300 includes the third position switch 3352. When the angle between the door panel 3310 and the plane P1 perpendicular to the axis X-X' of the food outlet hole 2021 is greater than or equal to the second preset angle, the third position switch 3352 generates the third position information, in which the second preset angle is greater than the first preset angle. The feeder can also be controlled by the following operations of:

acquiring the door opening instruction and controlling the second pressing portion to exert the pressure onto the door panel 3310 (for example, the pressure driving device 3341 drives the second pressing portion to exert the pressure onto the door panel 3310 to increase the gap between the door panel 3310 and the food outlet hole 2021);

controlling the door panel 3310 to move in the direction away from the food outlet hole 2021 (for example, the door driving device 3342 drives the second rotating shaft 3312 into rotation, thereby moving the door panel 3310 in the direction away from the food outlet hole 2021); and in response to the third position information, controlling the door panel 3310 to stop moving (for example, by stopping the aforementioned door driving device 3342).

In this embodiment, during the opening of the door panel 3310, the second pressing portion exerts the pressure onto the door panel 3310 to tilt the door panel 3310, so as to facilitate the subsequent rotation and open of the door panel 3310.

In particular, the feeder is provided with the vacuum pump 3361, and when vacuumizing the food accommodating chamber by the vacuum pump 3361 after the door panel 3310 is closed, the second pressing portion will greatly help the opening of the door panel 3310. At this time, the food accommodating chamber is in a negative pressure state, and it is difficult to open the door panel. In this embodiment, a downward pressure is exerted onto the door panel 3310 by the second pressing portion, which is beneficial to reduce the working difficulty of the door driving device 3342.

It should be understood that, even if the feeder does not include the vacuum device, sometimes the negative pressure will be formed in the sealed food accommodating chamber, which makes it difficult to open the door panel. In this case, the structure of the present embodiment can also be used to reduce the working difficulty of the door driving device and improve the stability and efficiency.

In this embodiment, the door panel 3310 is provided with the boss 3320, and the outer peripheral wall of the boss 3320 is configured to abut against the inner peripheral wall of the food outlet hole 2021. The angle between the door panel 3310 and the plane P1 perpendicular to the axis X-X' of the food outlet hole 2021 can be an angle between the surface of the door panel 3310 facing the boss 3320 and the plane P1 perpendicular to the axis X-X' of the food outlet hole 2021.

When closing the door assembly 3300, the feeder can control the door driving device 3342 to drive the door panel 3310 to close from a position with a large opening degree (for example, a position in which the angle between the door panel 3310 and the plane P1 perpendicular to the axis X-X' of the food outlet hole 2021 is greater than or equal to the second preset angle, and the first bump 3313 abuts against the third position switch 3352) to a position with a small opening degree (for example, a position in which the angle between the door panel 3310 and the plane P1 perpendicular to the axis X-X' of the food outlet hole 2021 is less than or equal to the first preset angle, and the first bump 3313 abuts against the first position switch 3351).

When the door panel 3310 is closed to the position with the small opening degree, the first position switch 3351 generates the first position information, and the pressure driving device 3341 drives the first pressing portion 3331 to abut against the door panel 3310 according to the first position information, so that the opening degree of the door panel 3310 is further reduced and the door assembly 3300 is placed in the abutment position.

It should be noted that the door panel 3310 is provided with the boss 3320, and the outer peripheral wall of the boss 3320 is configured to abut the inner peripheral wall of the food outlet hole 2021. The abutment position of the door assembly 3300 corresponds to the position in which the outer peripheral wall of the boss 3320 abuts against the inner peripheral wall of the food outlet hole 2021.

After the door assembly 3300 is at the abutment position (for example, corresponding to the position in which the first pressing portion 3331 abuts against the door panel 3310 and moves to the preset position, and the second bump 3335 abuts against the second position switch 3353), the second position switch 3353 generates the second position information, and the pressure driving device 3341 stops the power output according to the second position information, to complete the closing of the door assembly 3300.

After the closing of the door assembly 3300, the accommodating chamber 2001 can be vacuumed according to the above-mentioned second position information (for example, the vacuum pump 3361 is activated to vacuum the accommodating chamber), while the solenoid valve 3362 can isolate the accommodating chamber 2001 from the outside according to the second position information. When the vacuum degree in the accommodating chamber 2001 is greater than or equal to the first preset vacuum degree, the negative pressure switch 3363 outputs a first pressure signal, and the vacuum pump 3361 is stopped according to the first pressure signal, to complete the vacuuming operation for the accommodating chamber 2001.

When the door assembly 3300 needs to be opened, the accommodating chamber 2001 can be communicated with the outside according to the door opening instruction (for example, by switching the above-mentioned solenoid valve 3362 to an open state), and the negative pressure in the accommodating chamber 2001 can be relieved. When the vacuum degree in the accommodating chamber 2001 is less than or equal to the second preset vacuum degree (the second preset vacuum degree is less than the first preset vacuum degree), that is, when the pressure relief is completed or substantially completed, the negative pressure switch 3363 outputs the second pressure signal. The pressure driving device 3341 drives the second pressing portion to abut against the door panel 3310 according to the door opening instruction and the second pressure signal, so as to tilt the door panel 3310.

After the door panel 3310 is tilted to present a certain opening degree (in this embodiment, for example, to the position in which the angle between the surface of door panel 3310 facing the boss 3320 and the plane P1 perpendicular to the axis X-X' of the food outlet hole 2021 is greater than the first preset angle, and the first bump 3313 disengages from the first position switch 3351), the first position switch 3351 outputs the fourth position information, and the door driving device 3342 drives the door panel 3310 to move away from the food outlet hole 2021 according to the fourth position information, so as to continue to increase the opening degree of the door panel 3310.

After the opening degree of the door panel 3310 is increased to a desired position (in this embodiment, for example, corresponding to the position in which the angle between the surface of door panel 3310 facing the boss 3320 and the plane P1 perpendicular to the axis X-X' of the food outlet hole 2021 is greater than or equal to the second preset angle, and the first bump 3313 abuts against the third position switch 3352), the third position switch 3352 generates the third position information, the door driving device 3342 stops the power output according to the third position information, and the opening of the door assembly 3300 is completed.

What described is merely preferable embodiments of the disclosure, and is not intended to limit the scope of protection of the disclosure. All equivalent structures made using the specification and accompanying drawings of the disclosure, or direct or indirect applications of the disclosure to other related technical fields should be included within the scope of protection of the disclosure.

The invention claimed is:

1. A feeder, comprising:
   a mount provided with a food outlet hole; and
   a door assembly comprising:
   a door panel configured to close or open the food outlet hole, wherein the door panel comprises a movable side and a fixed side, and wherein the movable side of the door panel is higher in a longitudinal direction than the fixed side or is flush with the fixed side in the longitudinal direction;
   a pressing member rotatably mounted to the mount, the pressing member comprising a first pressing portion and a first rotating shaft rotatably connected to the mount, the first pressing portion being configured to act on the door panel to exert a pressure onto the door panel so as to reduce a gap between the door panel and the food outlet hole; and
   a second rotating shaft, wherein the fixed side of the door panel is fixedly connected to the second rotating shaft, the second rotating shaft is rotatably connected to the mount, and the movable side of the door panel is rotatable with respect to the mount via the second rotating shaft;
   wherein the pressing member further comprises a second pressing portion, the second pressing portion being configured to act on the door panel to exert a pressure onto the door panel so as to increase a gap between the door panel and the food outlet hole.

2. The feeder according to claim 1, wherein the door panel is provided with a boss, an outer peripheral wall of the boss being configured to abut against an inner peripheral wall of the food outlet hole.

3. The feeder according to claim 2, wherein the first pressing portion and the second pressing portion are arranged at an outer peripheral wall of the first rotating shaft, the first pressing portion and the second pressing portion are arranged at intervals in a circumferential direction of the first rotating shaft.

4. The feeder according to claim 3, wherein the first pressing portion comprises a first batten, the first batten being in a shape of a rectangle extending in an axial direction of the first rotating shaft, the first batten being configured to abut against a surface of the door panel away from the boss in order to lift the door panel.

5. The feeder according to claim 4, wherein the second pressing portion comprises a second batten, the second batten being L-shaped, one end of the L-shape being connected to the first rotating shaft and the other end of the L-shape extending in a direction away from the first rotating shaft, wherein the second batten is configured to abut against a surface of the door panel adjacent to the boss to cause the door panel to sink.

6. The feeder according to claim 3, wherein the first rotating shaft and the second rotating shaft are arranged on opposite sides of the food outlet hole, the door assembly further comprising a pressure driving device which drives the pressing member into rotation through the first rotating shaft, the door assembly further comprising a door driving device which drives the door panel into rotation through the second rotating shaft.

7. The feeder according to claim 3, wherein the boss comprises a body and an elastic cap arranged around the body, and wherein an outer peripheral wall of the elastic cap is configured to abut against the inner peripheral wall of the food outlet hole.

8. The feeder according to claim 7, wherein the outer peripheral wall of the elastic cap is provided with an elastic annular plate extending in a circumferential direction of the elastic cap.

9. The feeder according to claim 7, wherein the outer peripheral wall of the elastic cap is inclined, and a cross-sectional area of a top of the elastic cap is less than a cross-sectional area of a bottom of the elastic cap.

10. The feeder according to claim 7, wherein the door panel is further provided with a connecting through hole, the bottom of the elastic cap being provided with a connecting post and an abutment block arranged on a side of the door panel away from the elastic cap, the connecting post passing through the connecting through hole and being connected to the abutment block which abuts against the door panel.

11. The feeder according to claim 7, wherein the feeder comprises a barrel mounted at the mount and a vacuum pump, the barrel defining an accommodating chamber for storing food, wherein the food outlet hole and the vacuum pump are in communication with the accommodating chamber.

* * * * *